(12) United States Patent
Okawa

(10) Patent No.: US 8,055,428 B2
(45) Date of Patent: Nov. 8, 2011

(54) VEHICLE PERIPHERAL MONITORING APPARATUS

(75) Inventor: Tatsuhiro Okawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1004 days.

(21) Appl. No.: 11/952,519

(22) Filed: Dec. 7, 2007

(65) Prior Publication Data

US 2008/0147316 A1 Jun. 19, 2008

(30) Foreign Application Priority Data

Dec. 14, 2006 (JP) ................... 2006-337500

(51) Int. Cl.
*B60Q 1/00* (2006.01)
(52) U.S. Cl. ............ 701/96; 340/435; 340/903; 342/70; 342/118; 701/301; 701/117; 701/300
(58) Field of Classification Search .................. 701/301, 701/96, 117, 300; 340/435, 903; 342/70, 342/118
See application file for complete search history.

(56) References Cited

FOREIGN PATENT DOCUMENTS

| DE | 101 08 646 A1 | 8/2001 |
| DE | 101 60 189 A1 | 6/2003 |
| DE | 103 41 128 A1 | 3/2005 |
| DE | 103 58 034 A1 | 7/2005 |
| JP | 7-257301 | 10/1995 |
| JP | 7-334790 | 12/1995 |
| JP | 2000-207696 | * 7/2000 |
| JP | 2001-124852 | * 5/2001 |
| JP | 2001-194457 | 7/2001 |
| JP | 2004-164188 | 6/2004 |
| JP | 2005-56372 | 3/2005 |
| JP | 2005-165752 | 6/2005 |
| JP | 2005-182198 | * 7/2005 |
| JP | 2005-345251 | 12/2005 |
| JP | 2008-52399 | 3/2008 |
| WO | WO 2004/021546 A2 | 3/2004 |

OTHER PUBLICATIONS

Machine translation 2001-124852.*
Machine translation 2005-182198.*
Machine translation 2000-207696.*
Office Action issued Apr. 7, 2011 in German Patent Application No. 10 2007 055 799.1-56.

* cited by examiner

*Primary Examiner* — Thomas Black
*Assistant Examiner* — Luke Huynh
(74) *Attorney, Agent, or Firm* — Oblon, Spivak, McClelland, Maier & Neustadt, L.L.P.

(57) ABSTRACT

A vehicle peripheral monitoring apparatus is disclosed. The apparatus includes a forward monitoring unit for monitoring an obstacle within a predetermined forward area extending in a direction forward of an own vehicle; one or more forward-lateral monitoring units for monitoring an obstacle within a predetermined forward-lateral area extending in a direction lateral of the own vehicle relative to the predetermined forward area; and a traveling environment detecting unit for detecting a traveling environment of the own vehicle, wherein the monitoring with the forward-lateral monitoring units is suppressed when the traveling environment detecting unit detects that the own vehicle is traveling on a predetermined road including a highway, and a level of the suppressing of the monitoring with the forward-lateral monitoring unit is eased when the traveling environment detecting unit detects that the own vehicle is traveling in a predetermined area, including a junction, of the predetermined road.

12 Claims, 10 Drawing Sheets

VEHICLE PERIPHERAL MONITORING APPARATUS

BACKGROUND OF THE INVENTION

1. Field of the Invention

The present invention relates to a vehicle peripheral monitoring apparatus for monitoring an obstacle around a vehicle.

2. Description of the Related Art

Recently, techniques have been commercialized for using a monitoring measure such as radar or a camera to monitor an obstacle such as a preceding vehicle, a stopped vehicle, or a pedestrian, and to perform vehicle distance control and collision prediction control.

As an exemplary application for such techniques as described above, an invention is disclosed for a peripheral monitoring apparatus for selectively using a long range radar unit and a short range radar unit. (See Patent Document 1, for example.) With the apparatus as described above, the long range radar unit is selected for high speed travel and the short range radar unit for low speed travel.

Patent Document 1

JP2005-165752A

However, with the related-art apparatus as described above, the long range radar unit is likely to be selected when traveling on a highway or a freeway. As a result, detecting a vehicle cutting in from the side at a junction of a highway or a freeway, or at a toll gate may be delayed.

SUMMARY OF THE INVENTION

It is a general object of the present invention to provide a technology for vehicle peripheral monitoring that substantially obviates one or more problems caused by the limitations and disadvantages of the related art.

It is a more particular object of the present invention to provide a vehicle peripheral monitoring apparatus which makes it possible to more appropriately monitor an obstacle around a vehicle.

According to an embodiment of the present invention, a vehicle peripheral monitoring apparatus is provided, including a forward monitoring unit for monitoring an obstacle within a predetermined forward area extending in a direction forward of an own vehicle; one or a plurality of forward-lateral monitoring units for monitoring an obstacle within a predetermined forward-lateral area extending in a direction lateral of the own vehicle relative to the predetermined forward area; and a traveling environment detecting unit for detecting a traveling environment of the own vehicle, wherein the monitoring with the forward-lateral monitoring units is suppressed when the traveling environment detecting unit detects that the own vehicle is traveling on a predetermined road including a highway, and a level of the suppressing of the monitoring with the forward-lateral monitoring units is eased when the traveling environment detecting unit detects that the own vehicle is traveling in a predetermined area, including a junction, of the predetermined road.

According to another embodiment of the present invention, a vehicle peripheral monitoring apparatus is provided, including a forward monitoring unit for monitoring an obstacle within a predetermined forward area extending in a direction forward of an own vehicle; one or a plurality of forward-lateral monitoring units for monitoring an obstacle within a predetermined forward-lateral area extending in a direction lateral of the own vehicle relative to the predetermined forward area; a vehicle speed obtaining unit for obtaining a vehicle speed; and a traveling environment detecting unit for detecting a traveling environment of the own vehicle, wherein the monitoring with the forward-lateral monitoring units is suppressed when the vehicle speed obtaining unit obtains a vehicle speed greater than or equal to a predetermined vehicle speed, and a level of the suppressing of the monitoring with the forward-lateral monitoring units is eased when the traveling environment detecting unit detects that the own vehicle is traveling in a predetermined area, including a junction, of a predetermined road including a highway.

According to a further embodiment of the present invention, a vehicle peripheral monitoring apparatus is provided, including a forward monitoring unit for monitoring an obstacle within a predetermined forward area extending in a direction forward of an own vehicle; one or a plurality of forward-lateral monitoring units for monitoring an obstacle within a predetermined forward-lateral area extending in a direction lateral of the own vehicle relative to the predetermined forward area; and a traveling environment detecting unit for detecting a traveling environment of the own vehicle, wherein the monitoring with the forward-lateral monitoring units is suppressed when the traveling environment detecting unit detects that the own vehicle is traveling on a predetermined road including a highway.

According to still another embodiment of the present invention, a vehicle peripheral monitoring apparatus is provided, including one or a plurality of forward-lateral monitoring units for monitoring an obstacle present in a forward-lateral direction of an own vehicle; and a traveling environment detecting unit for detecting a traveling environment of the own vehicle, wherein the monitoring with the forward-lateral monitoring units is suppressed when the traveling environment detecting unit detects that the own vehicle is traveling on a predetermined road including a highway, and a level of the suppressing of the monitoring with the forward-lateral monitoring units is eased when the traveling environment detecting unit detects that the own vehicle is traveling in a predetermined area, including a junction, and/or an area around a toll gate, of the predetermined road.

Other objects and further features of the present invention will be apparent from the following detailed description when read in conjunction with the accompanying drawings.

DETAILED DESCRIPTION OF THE PREFERRED EMBODIMENTS

In the following, embodiments of the invention are described with reference to the accompanying drawings.

First Embodiment

Figure 1:
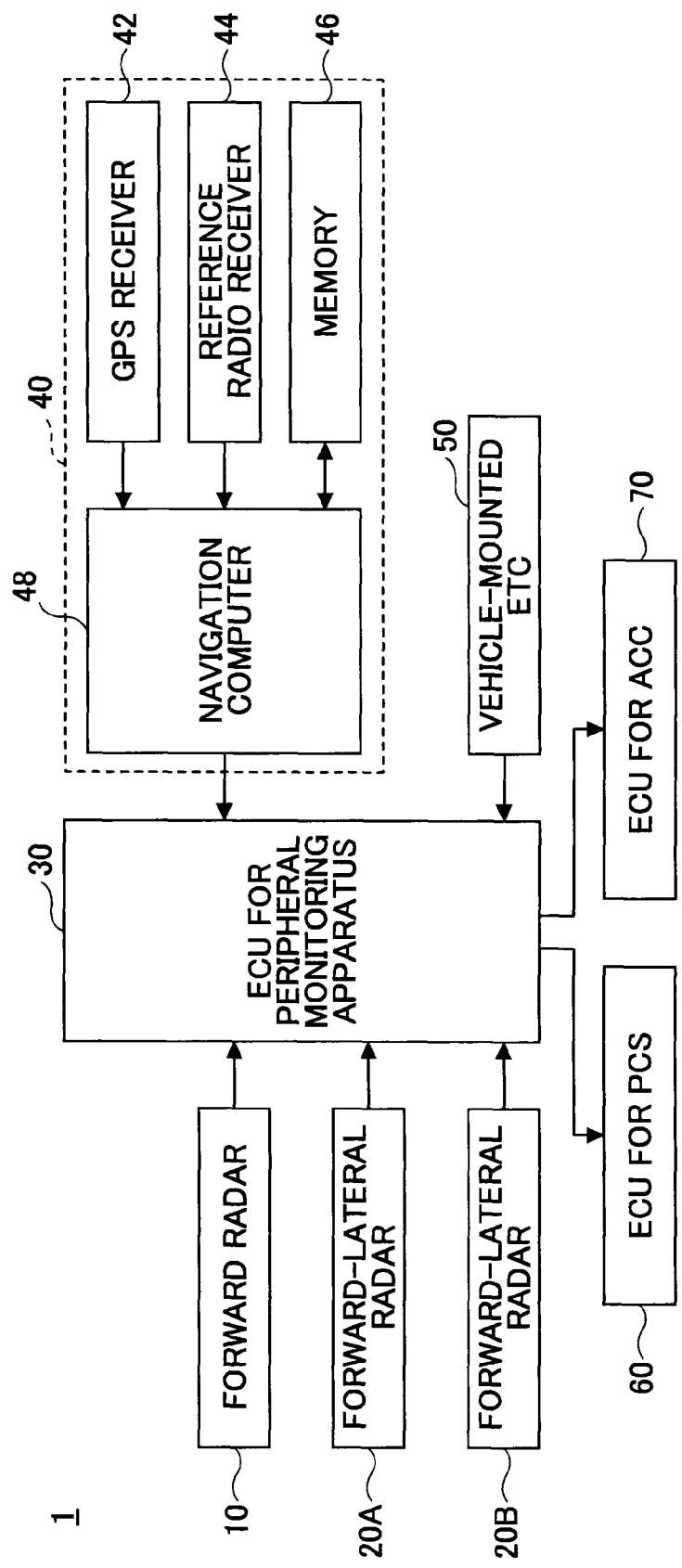
FIG. 1 is a diagram illustrating an example of an overall configuration of a vehicle peripheral monitoring apparatus 1.

A vehicle peripheral monitoring apparatus 1 according to a first embodiment of the present invention is described below. FIG. 1 shows an example of an overall configuration of a vehicle peripheral monitoring apparatus 1. The vehicle peripheral monitoring apparatus 1 includes, as main components, forward radar 10; forward-lateral radars 20A and 20B; an ECU (electronic control unit) for the vehicle peripheral monitoring apparatus 30; a navigation unit 40; and a vehicle-mounted ETC (Electronic Toll Controller) 50. An ECU for PCS (pre-crush safety) 60 and an ECU for ACC (adaptive cruise control) 70 are illustrated for using an output of the vehicle peripheral monitoring apparatus to perform control. A solid-line arrow shown represents a major information flow by means of wired or wireless communications.

A forward radar 10 and forward-lateral radars 20A and 20B, which are millimeter-wave radar units, for example, are units for using a time it takes for a reflected wave of an output millimeter wave to return, an angle of the reflected wave, and frequency change to detect a distance to, a direction of, and a speed of an object (an obstacle). The respective radars periodically perform such detecting as described above to output information on the detected object via communication lines to the ECU for the peripheral monitoring apparatus 30. The ECU for the peripheral monitoring apparatus 30 monitors an obstacle based on information received from the respective radars. Electric power for use in operating the respective radars may be provided by converting to a low-voltage electric power supply (e.g., 12V), via a DC-to-DC converter, a high-voltage electric power supply generated by an alternator connected via a belt to a crankshaft, and then temporarily accumulating low-voltage electric energy in a battery for driving accessories.

A unit for detecting the distance to an object may be laser radar, infrared radar, sonar radar, or a stereo camera apparatus in lieu of millimeter-wave radar.

Figure 2:
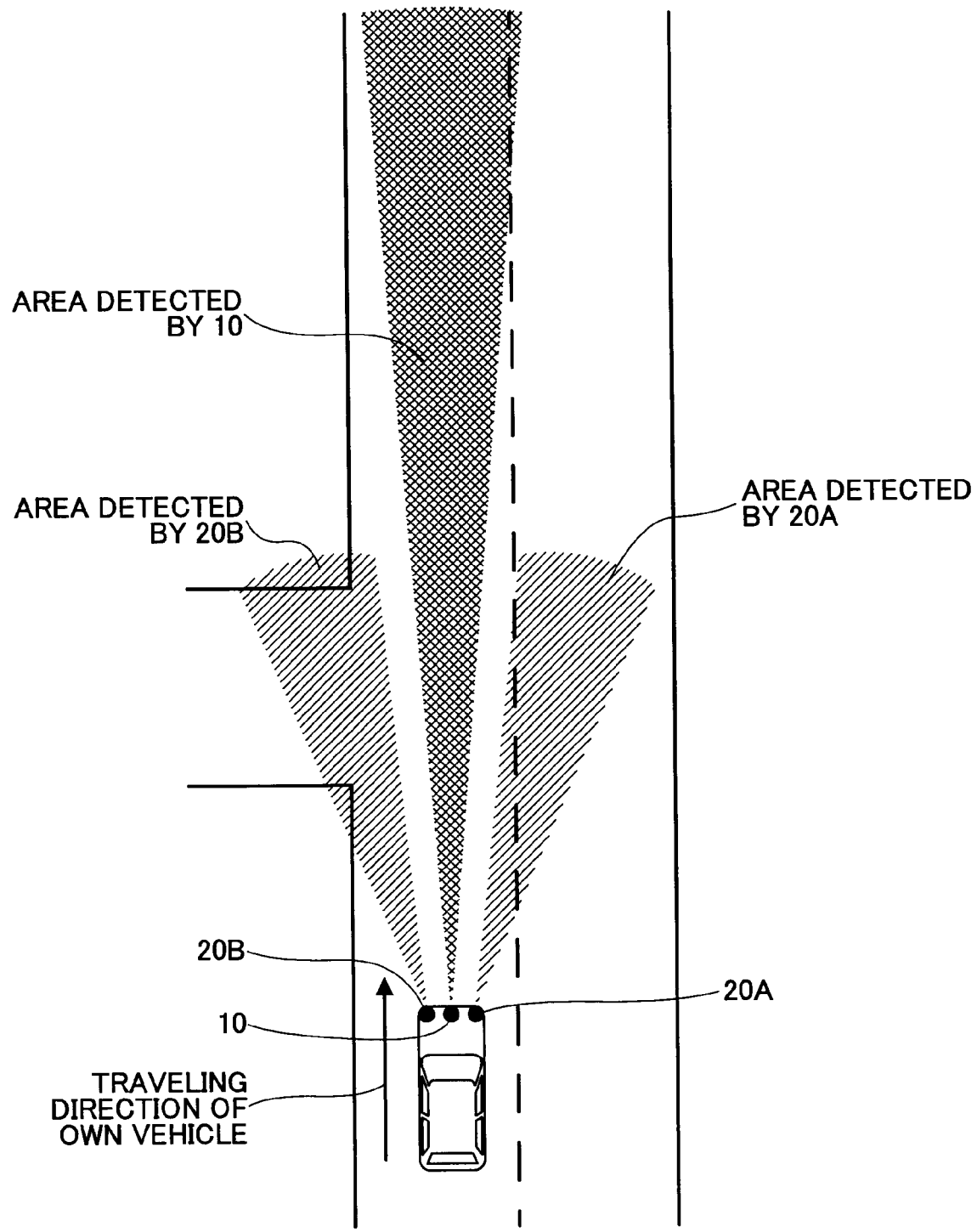
FIG. 2 is a diagram illustrating examples of areas to be detected by forward radar 10 and forward-lateral radars 20A and 20B.

FIG. 2 shows examples of areas detected by the forward radar 10 and the forward-lateral radars 20A and 20B. The forward radar 10 may be disposed at the back of a front grille, with an area in a forward direction of the own vehicle defined as an area to be monitored thereby (corresponding to the predetermined forward area in the claims). The forward-lateral radar 20A may be disposed at a hole formed on the right side of a front bumper, with an area in a right diagonal forward direction of the own vehicle defined as an area to be monitored thereby (corresponding to a portion of the predetermined forward-lateral area in the claims). The forward-lateral radar 20B may be disposed at a hole formed on the left side of the front bumper, with an area in a left diagonal forward direction of the own vehicle defined as an area to be monitored thereby (corresponding to a portion of the predetermined forward-lateral area in the claims).

As shown in FIG. 2, the forward radar 10 is for monitoring an obstacle (including a preceding vehicle, which is a vehicle traveling ahead of the own vehicle, and in the same direction as and on the same lane as the own vehicle) in a forward direction of the own vehicle, while the forward-lateral radars 20A and 20B are primarily for monitoring for an obstacle (e.g. a vehicle cutting in, a pedestrian, or a bicycle) making a lateral entry ahead of the own vehicle.

The ECU for the peripheral monitoring apparatus 30 is, for example, a computer unit to which a ROM and a RAM are connected, via a bus, to a CPU, and also includes a storage medium such as a hard disk or a DVD (Digital Versatile Disk), an I/O port, a timer, and a counter. Programs to be executed by the CPU as well as data are stored in the ROM. The ECU for the peripheral monitoring apparatus 30 performs output control and on-off control of the forward radar 10 and the forward-lateral radars 20A and 20B. Moreover, when any one of the forward radar 10 and the forward-lateral radars 20A and 20B detects a reflected wave with a strength greater than or equal to a predetermined threshold, the ECU for the peripheral monitoring apparatus 30 determines that there is an obstacle, and outputs, via a multiplexed communication line, a position and a relative speed of the obstacle to the ECU for PCS 60 and the ECU for ACC 70. The communications via the multiplexed communication line as described above, and communications between the ECU for the peripheral monitoring apparatus 30 and a navigation apparatus 40 are conducted using a communications protocol such as a CAN (Controller Area Network), BEAN, AVC-LAN, or FlexRay.

The ECU for PCS 60 is, for example, a computer unit having the same hardware configuration as the ECU for the peripheral monitoring apparatus 30. The ECU for PCS 60 performs various pre-crash safety control techniques (collision prediction control techniques) such as determining, when an obstacle approaching an own vehicle at a relative speed greater than or equal to a predetermined speed enters into a range within a predetermined distance of the vehicle, that a collision with the obstacle is unavoidable. The pre-crash safety control techniques may include such techniques as automatic seat belt retracting control for ensuring proper passenger posture; control of inflating a pre-crash air bag (may include an initial inflating of a multi-stage air bag); avoiding an obstacle by brake control and steering control; or a sounding buzzer.

The ECU for ACC 70 is, for example, a computer unit having the same hardware configuration as the ECU for the peripheral monitoring apparatus 30. The ECU for ACC 70 controls a throttle valve control motor and a transmission such that the own vehicle maintains a vehicle distance to a preceding vehicle detected as an obstacle at a predetermined target vehicle distance and travels at the maintained vehicle distance. The target vehicle distance is set, for example, by a user operating a hard switch or a GUI (graphical user interface), or speech entry.

In this way, obstacle information sets obtained by the respective radars are used for safety control based on collision prediction, and vehicle distance control for reducing driving workload. In particular, the combined use of the forward radar 10 and the forward-lateral radars 20A and 20B makes it possible to monitor both an obstacle ahead of the vehicle and an obstacle making an entry (or bursting out) from the side, thus realizing thorough vehicle peripheral control.

However, with a multiple number of (3 in this embodiment) of the millimeter-wave radar units, a problem may occur such that power consumption increases with the number of the units. The electric power consumption of the millimeter-wave radar units is so large that it cannot be ignored in assessing energy consumption of a vehicle. Therefore, there is a need for a measure to reduce such electric power consumption increase from a point of view of reducing energy consumption. Moreover, heat dissipation of the millimeter-wave radar units cannot be ignored, especially at the time of traffic congestion.

Furthermore, with a multiple number of millimeter-wave radar units, a problem may occur such that the frequency of false detection of obstacles due to various noise factors around the vehicle becomes high. The false detection of obstacles is also a problem to be alleviated since it leads to hunting in vehicle distance control, and unwanted operations in automatic seat belt retracting control, or of a pre-crash air bag inflation in collision prediction control.

Such problems as described above may similarly occur, more or less, when using a laser radar, an infrared radar, a sonar radar, or a stereo camera apparatus in lieu of a millimeter-wave radar.

Thus, the vehicle peripheral monitoring apparatus 1 of this embodiment is such that whether the own vehicle is traveling on a highway or a freeway (below collectively referred to as predetermined road) is detected, and, if yes, to basically stop operations of the forward-lateral radars 20A and 20B. The reason for embodying the vehicle peripheral monitoring apparatus 1 as described above is that, as there are basically no intersections or pedestrians, the probability of occurrence of an obstacle making a lateral entry ahead of the vehicle will be low. In this way, reducing the electric power consumption of the millimeter-wave radar apparatus as well as heat dissipation, and unwanted false detections of obstacles are made possible. The term predetermined road may be defined to refer only to a highway. Moreover, it is desirable then to continue the monitoring with the forward radar 10. Such monitoring as described above is for maintaining the continuity of pre-crash safety control based on vehicle distance control and forward monitoring.

Now, even on a predetermined road, there are situations, such as traveling at a junction or in an area around a toll gate, where the probability of occurrence of an obstacle making a lateral entry ahead of the vehicle becomes high. The reason for the above is that, at a junction, there are naturally vehicles cutting in ahead of the own vehicle, and, especially the number of toll gates is different from that of lanes, there are vehicles changing lanes. Leaving the operations of the forward-lateral radars 20A and 20B stopped in such situations as described above would diminish the significance of having provided the radar units as described above. The term "junction" herein may include not only a junction from a local road to a highway, but also all portions where a vehicle may more or less join from a branch route to a main route of a predetermined road, including a junction, at an interchange, from one route to another of a highway, and a junction or a ramp way section from a parking/service area to a main route.

Then, this embodiment embodies the forward-lateral radars 20A and 20B such that they are operated within a predetermined area at a junction or around a toll gate. Such operating as described above may be provided at the same output and sensitivity as the operation when the vehicle travels on a local road other than a highway, or the output and/or sensitivity may be changed slightly.

Figure 3A:
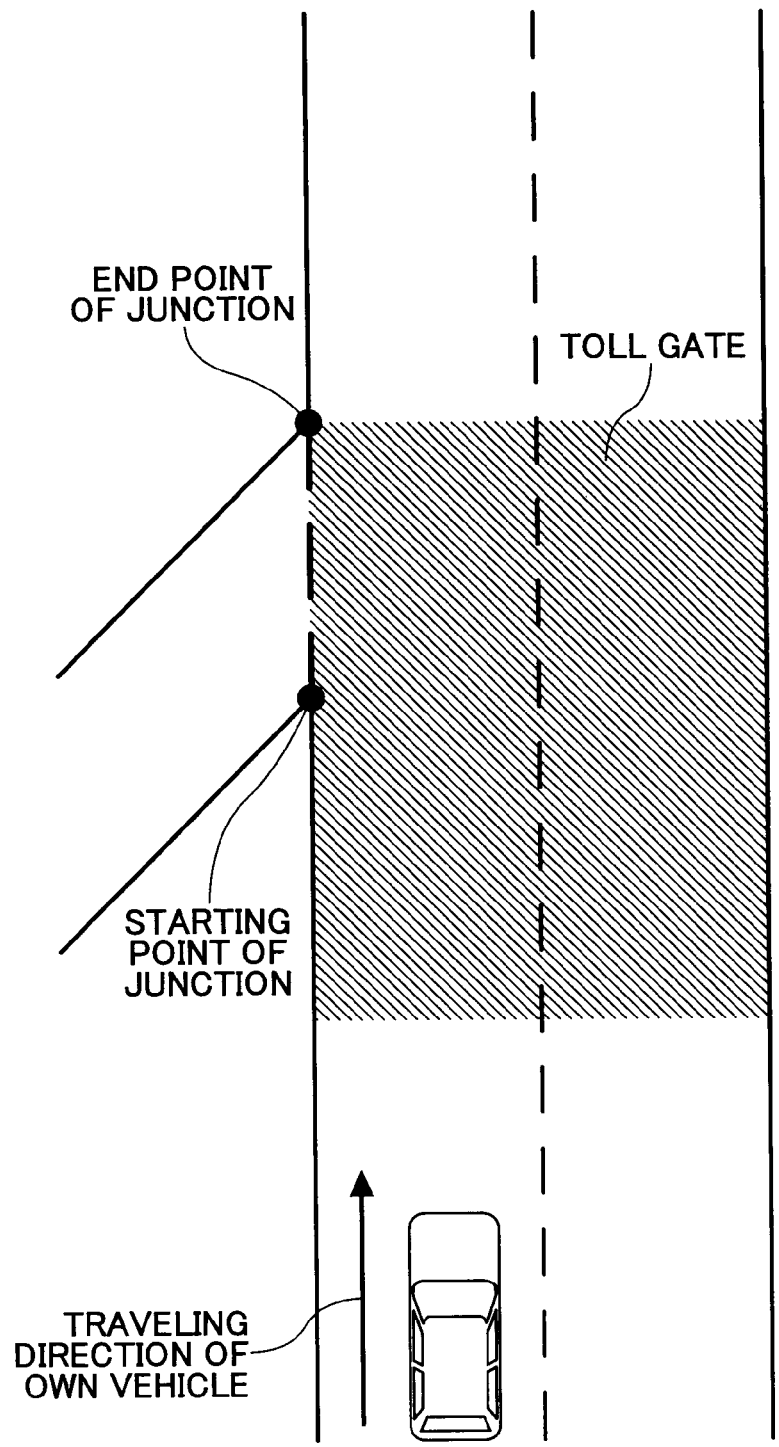
FIG. 3A is a diagram illustrating a specific example of a predetermined area.
Figure 3B:
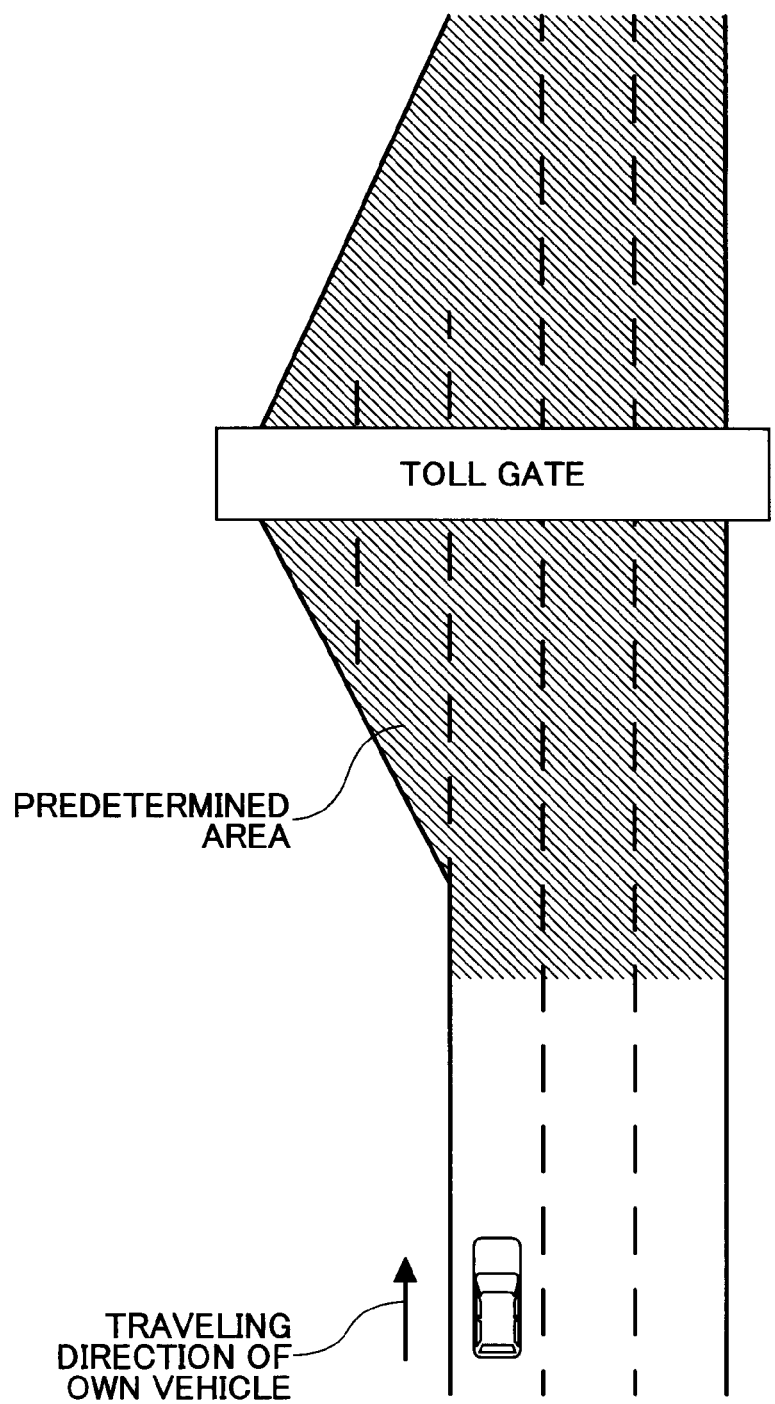
FIG. 3B is a diagram illustrating another specific example of the predetermined area.

A predetermined area may be set as an area between a point which is a predetermined distance (e.g., hundred and a few tens of meters to a few kilometers) before a starting point of a junction and an end point of the junction (see FIG. 3A). Moreover, the predetermined area may be set as an area between a point which is a predetermined distance (e.g., hundred and a few tens of meters to a few kilometers) before a starting point of a junction and a point which is the predetermined distance after an end point of the junction (see FIG. 3B). Different distances may be used for the junction and for the toll gate.

Such control as described above provides for, on a predetermined road, operating the forward-lateral radars 20A and 20B only when the operations thereof are needed, and stopping them otherwise. Therefore, the forward-lateral radars 20A and 20B may be appropriately operated according to a probability of occurrence of an obstacle making a lateral entry. In other words, an obstacle around a vehicle may be more appropriately monitored.

Detecting whether a vehicle is traveling on a predetermined road or in a predetermined area is realized using functions of the navigation apparatus 40 and a vehicle-mounted ETC 50. Below the functions of the navigation apparatus 40 and the vehicle-mounted ETC 50 are described.

The navigation apparatus 40 includes, as main components, a GPS receiver 42; a reference radio receiver 44; a memory 46; and a navigation computer 48.

The GPS receiver 42 receives a radio signal, including sets of satellite orbit and time data, from GPS satellites. Such received sets of data as described above are transmitted to the navigation computer 48 for use in locating the current position of the own vehicle. The reference radio receiver 44 receives a radio wave from a reference station used with a DGPS (a differential GPS) or a RTK-GPS (a real-time kinematic GPS) technique.

For the memory 46, recording media such as a hard disk and a DVD, CD-ROM are used. In the memory is stored map information. Such map information has road shapes represented by nodes, and links connecting the nodes. Moreover, in association with the respective links are stored sets of information on road types (highway, freeway, local road) as well as coordinates of starting and end points of junctions in highways and freeways, and coordinates of toll gates.

The navigation computer 48 performs a correction operation based on the DGPS or RTK-GPS technique as described above based on radio signals, from satellites, received by the GPS receiver 42, and a radio signal from a reference station received by the reference radio receiver 44, and obtains the current location (latitude, longitude, altitude) of the own vehicle. Using the DGPS or RTK-GPS technique makes it possible to improve the accuracy of GPS measurements and to perform finer control. Not using the DGPS or RTK-GPS technique leads to doing away with the reference radio receiver 44, but causes the GPS measurement accuracy to decrease slightly. Then, from such current own vehicle position located as described above, a recommended route up to a destination input by a user is generated, and a known route guidance is performed using a liquid crystal display apparatus and a speaker.

Moreover, the navigation computer 48 compares the current own vehicle position with information stored as map information, determines whether the vehicle is traveling on a predetermined road or in a predetermined area, and outputs the result of the determining at the ECU for peripheral monitoring apparatus 30.

The vehicle-mounted ETC 50, via a dedicated antenna, or an antenna shared with the navigation apparatus 40, transmits to and receives from an ETC roadside unit, provided at a toll gate of a toll road, toll collection information. Inserting into the vehicle-mounted ETC 50 an ETC smart card having an IC chip mounted thereon provides for the vehicle-mounted ETC to wirelessly communicate with the ETC roadside unit information necessary to make a toll payment. Moreover, the vehicle-mounted ETC 50 records the vehicle type as well as an ID of the toll gate entered at the time the own vehicle enters a toll road; and records the vehicle type as well as the ID of the toll gate exited at the time of exiting a toll road, and performs a toll road collection process. Furthermore, the vehicle-mounted ETC 50 successively outputs, at the ECU for the peripheral monitoring apparatus 30, ETC usage patterns including whether the own vehicle is traveling on a toll road and which toll gate has been passed. The ETC usage patterns are used by the ECU for the peripheral monitoring apparatus 30 as supplementary information for detecting whether the own vehicle is traveling on a highway and whether it is traveling in an area around a toll gate. The supplementary information is effective especially when GPS accuracy is not sufficient.

Figure 4:
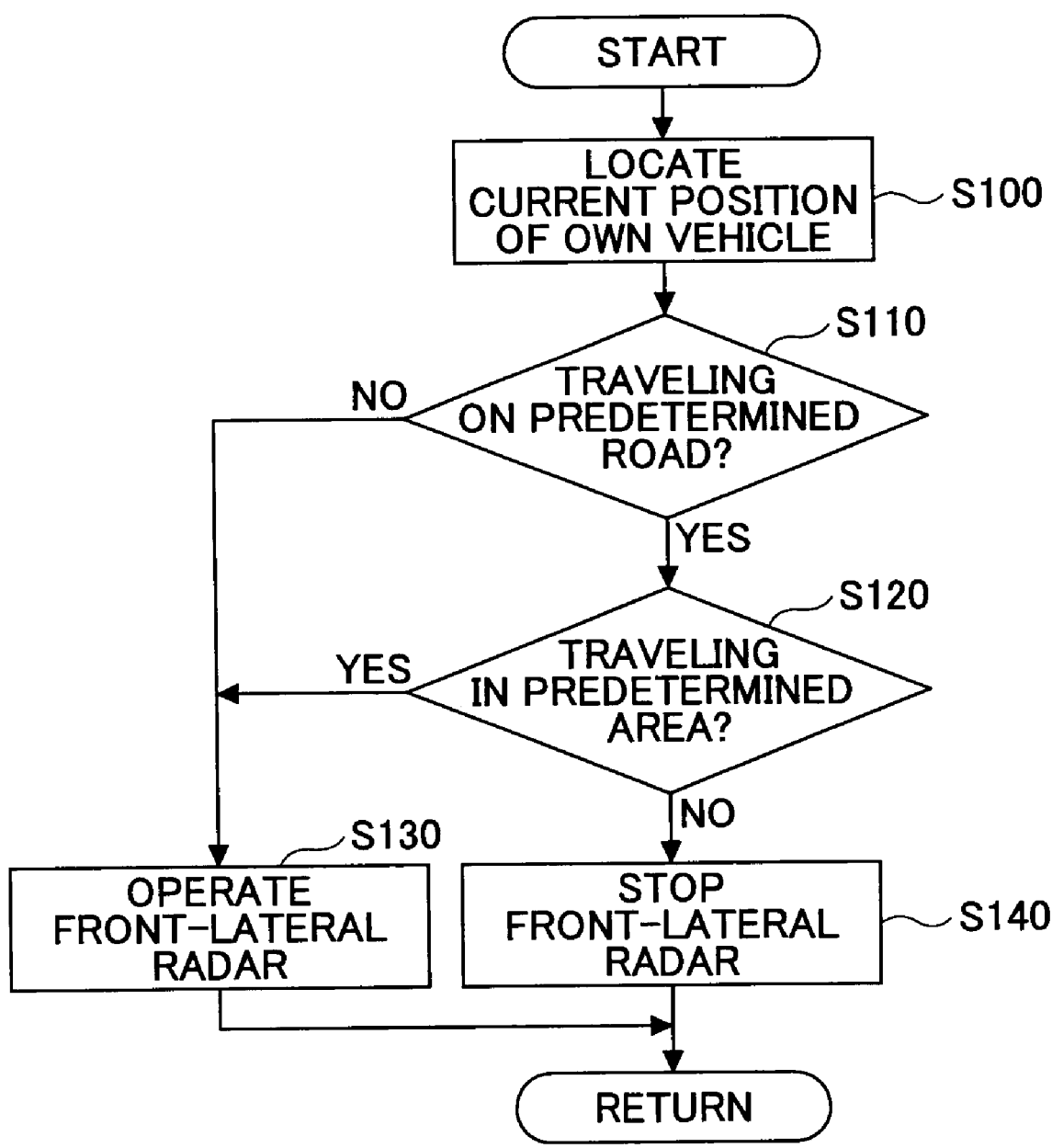
FIG. 4 is a flowchart illustrating a flow of characteristic processes to be executed by the vehicle peripheral monitoring apparatus 1.

FIG. 4 is a flowchart illustrating a flow of characteristic processes to be executed by the vehicle peripheral monitoring apparatus 1. The flow as described above is repeatedly executed every predetermined period, for example.

First, the current position of the own vehicle is located in the navigation apparatus 40 (S100).

Then, whether the own vehicle is traveling on a predetermined road is determined (S110). If no in S110, the forward-lateral radars 20A and 20B are operated (S130).

On the other hand, if yes, the process proceeds to determining whether the own vehicle is traveling in a predetermined area (S120). If no in S120, the forward-lateral radars 20A and 20B are stopped (S140). Moreover, if yes, the forward-lateral radars 20A and 20B are operated (S130).

The vehicle peripheral monitoring apparatus 1 according to this embodiment provides for stopping the forward-lateral radars 20A and 20B when the own vehicle is traveling on a predetermined road including a highway, except when it is traveling in a predetermined area at a junction or around a toll gate, making it possible to more appropriately monitor an obstacle around the own vehicle while reducing electric power consumption, heat dissipation, and unwanted false detecting of an obstacle of the forward-lateral radars 20A and 20B.

Second Embodiment

Figure 5:
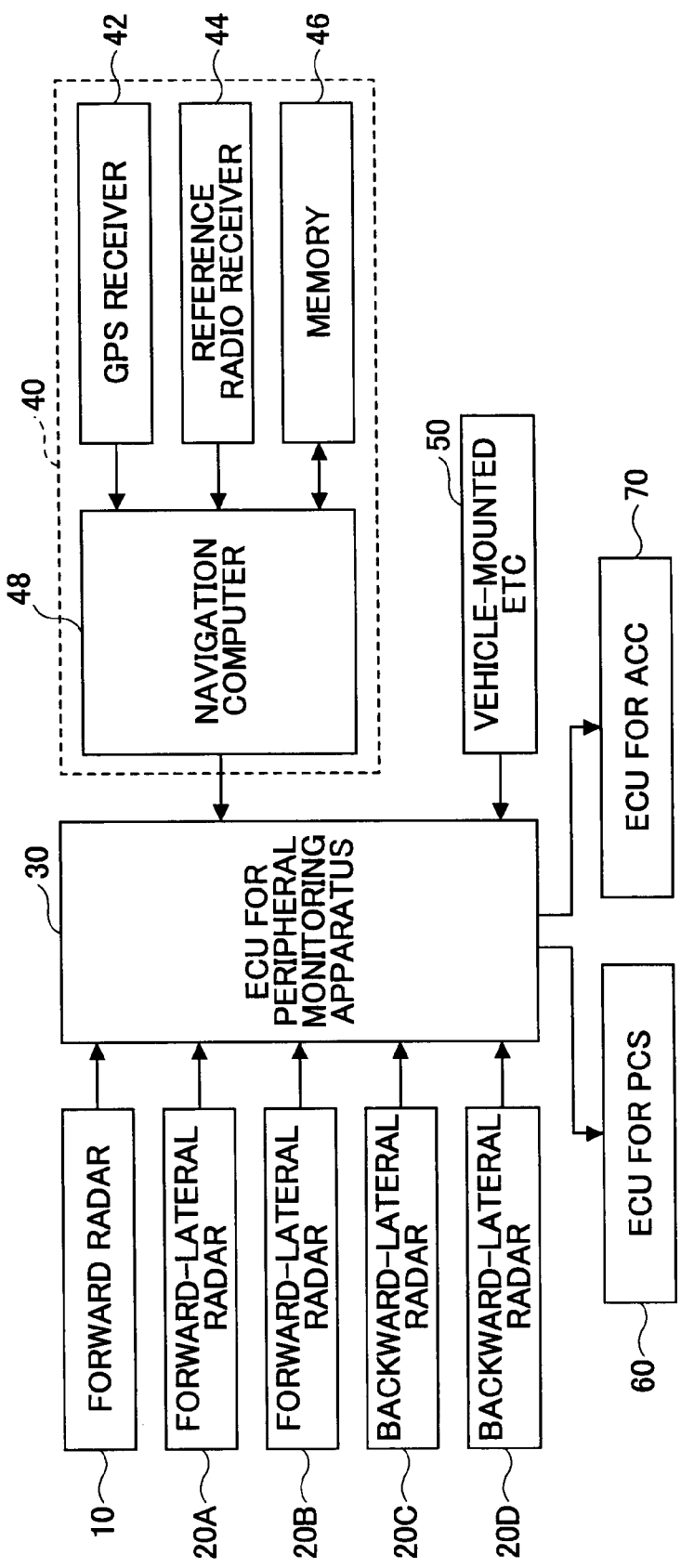
FIG. 5 is a diagram illustrating an example of an overall configuration of a vehicle peripheral monitoring apparatus 2.

A vehicle peripheral monitoring apparatus 2 according to a second embodiment of the present invention is described below. FIG. 5 shows an example of an overall configuration of the vehicle peripheral monitoring apparatus 2. As shown, the vehicle peripheral monitoring apparatus 2 is configured to have not only the elements of the vehicle peripheral monitoring apparatus 1, but also backward-lateral radars 20C and 20D. The same letters are given for the same parts, so that the explanations are omitted.

The backward-lateral radars 20C and 20D may be the same millimeter-wave radar units as the forward radar 10 and the forward-lateral radars 20A and 20B, or may be replaced with a laser radar, an infrared radar, a sonar radar, or a stereo-camera apparatus.

Figure 6:
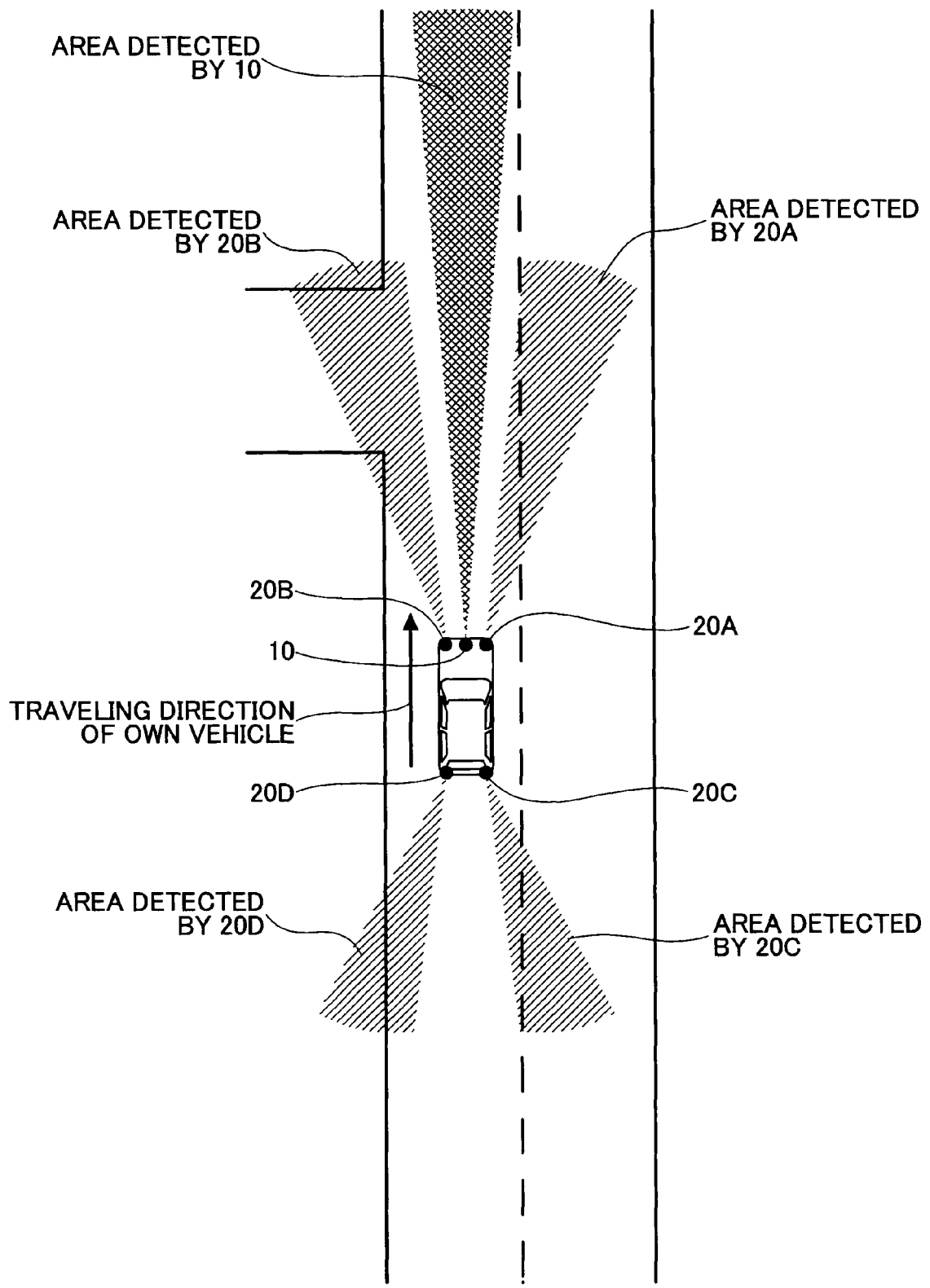
FIG. 6 is a figure illustrating an example of areas detected by the forward radar 10; the forward-lateral radars 20A and 20B; and the backward lateral radars 20C and 20D.

FIG. 6 shows examples of areas detected by the forward radar 10; the forward-lateral radars 20A and 20B; and the backward lateral radars 20C and 20D. The backward-lateral radar 20C may be disposed at a hole formed on the right side of a rear bumper, with an area in a right diagonal backward direction of the own vehicle defined as an area to be monitored thereby (corresponding to a part of the predetermined backward-lateral area in the claims). The backward-lateral radar 20D may be disposed at a hole formed on the left side of a rear bumper, with an area in a left diagonal backward direction of the own vehicle defined as an area to be monitored thereby (corresponding to a part of the predetermined backward-lateral area in the claims). For also the backward-lateral radars 20C and 20D, output control and on-off control is performed by means of the ECU for the peripheral monitoring apparatus 30. As shown in FIG. 6, the backward-lateral radars 20C and 20D are primarily for monitoring for a vehicle passing by from the rear to the front of the own vehicle.

The vehicle peripheral monitoring apparatus 2 according to this embodiment is embodied such that the control process to be executed thereby is the control process to be executed by the vehicle peripheral monitoring apparatus 1 according to the first embodiment. Now the forward-lateral radars 20A and 20B are operated in case an obstacle is detected approaching in the rear of the own vehicle at a speed greater than or equal to a predetermined relative speed as well as in case the own vehicle is traveling in a predetermined area when traveling on a predetermined road. The above is based on the fact that it is highly likely, when there is an obstacle, or another vehicle seeking to pass by the own vehicle from the back to the front, approaching, in rear of the own vehicle, at a speed greater than or equal to a predetermined relative speed, for the other vehicle to cut in to the front of the own vehicle. Therefore, even in such a case as described above, operating the front-lateral radars 20A and 20B makes it possible to rapidly start monitoring when such other vehicle as described above cuts in to the front of the vehicle.

In a manner similar to the first embodiment, such process as described above provides for, on a predetermined road, operating the forward-lateral radars 20A and 20B only when the operations thereof are needed, and stopping them otherwise. Therefore, the forward-lateral radars 20A and 20B may be appropriately operated according to a probability of occurrence of an obstacle making a lateral entry. In other words, an obstacle around a vehicle may be more appropriately monitored.

Moreover, the forward-lateral radars 20A and 20B may be gradually operated according to a relative speed of an obstacle approaching in the rear of the own vehicle. For example, when the relative speed slightly exceeds the predetermined relative speed as described above, the forward-lateral radars 20A and 20B are operated with a narrower area to be detected, while when the relative speed significantly exceeds the predetermined relative speed as described above, the forward-lateral radars 20A and 20B are operated with a wider area to be detected.

Now with respect to a potential problem of electric power consumption and heat dissipation of backward-lateral radars 20C and 20D, as the speed relative to the own vehicle of an obstacle approaching in the rear is, normally, sufficiently low compared to the speed relative to the own vehicle of an obstacle in the forward or forward-lateral direction, there is no harm in making the strength of the output millimeter wave small to shorten the detectable distance. Therefore, electric power consumption and heat dissipation are reduced relative to a case of continuously operating the forward-lateral radars 20A and 20B in a predetermined road.

Figure 7:
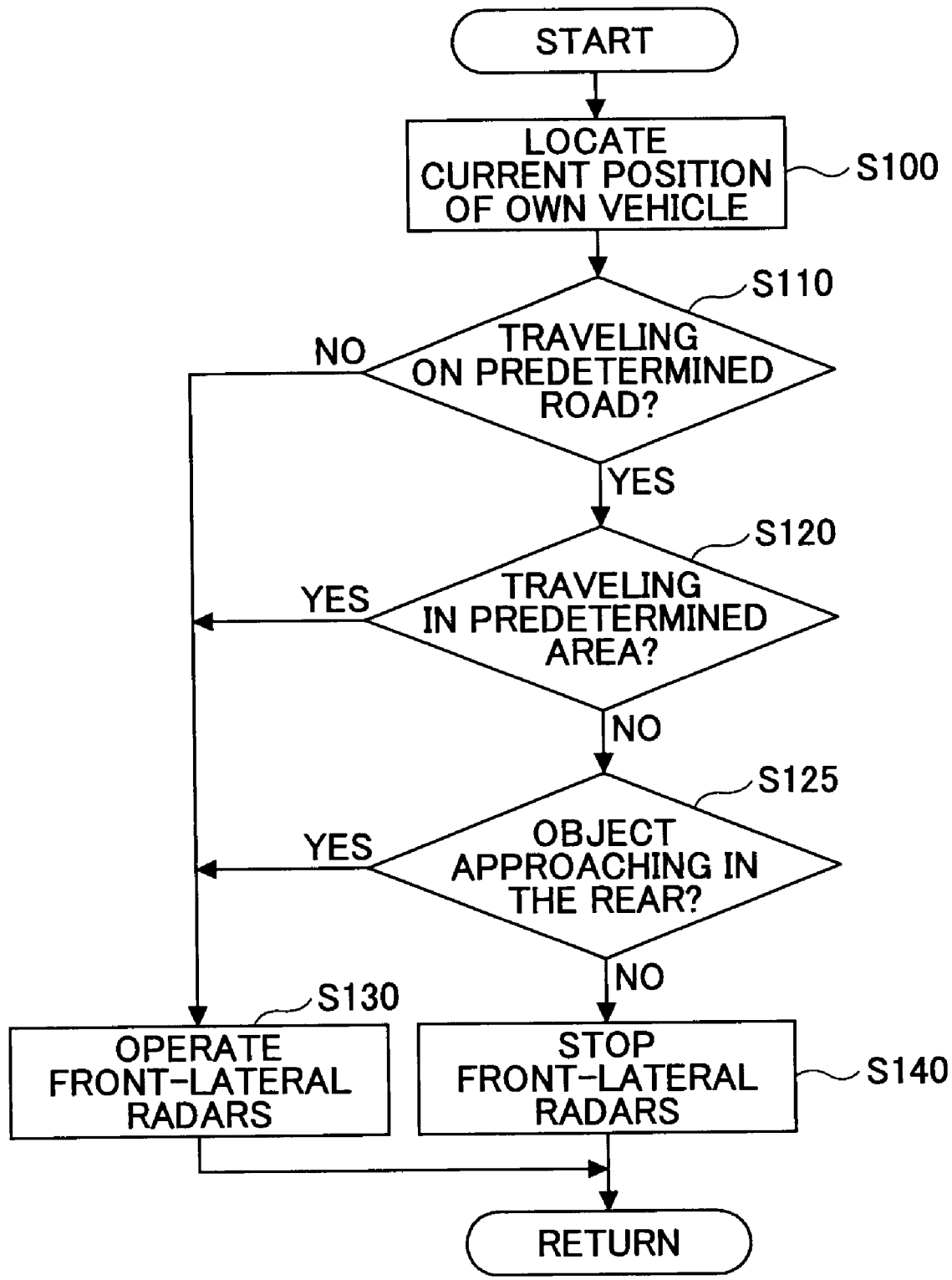
FIG. 7 is a flowchart illustrating a flow of characteristic processes to be executed by the vehicle peripheral monitoring apparatus 2.

FIG. 7 is a flowchart illustrating a flow of characteristic processes to be executed by the vehicle peripheral monitoring apparatus 2. The flow as described above is repeatedly executed every predetermined period, for example. The parts which are the same as in FIG. 4 are given the same step numbers, so that the explanations are omitted.

In this embodiment, when an own automobile is traveling on a predetermined road, the process proceeds to determining whether the own vehicle is traveling in a predetermined area (S120). If no, whether an obstacle is detected approaching, in the rear of the own vehicle, at a speed greater than or equal to a predetermined relative speed is determined (S125).

If no, the forward-lateral radars 20A and 20B are stopped (S140). Moreover, if yes, the forward-lateral radars 20A and 20B are operated (S130).

The vehicle peripheral monitoring apparatus 2 according to this embodiment provides for stopping the forward-lateral radars 20A and 20B when the own vehicle is traveling on a predetermined road including a highway, except when it is traveling in a predetermined area at a junction or around a toll gate or when another vehicle is approaching in the rear of the own vehicle in an attempt to pass by from the rear to the front of the own vehicle, making it possible to more appropriately monitor an obstacle around the vehicle while reducing electric power consumption, heat dissipation, and unwanted false detecting of an obstacle of the front-lateral radars 20A and 20B.

Third Embodiment

Figure 8:
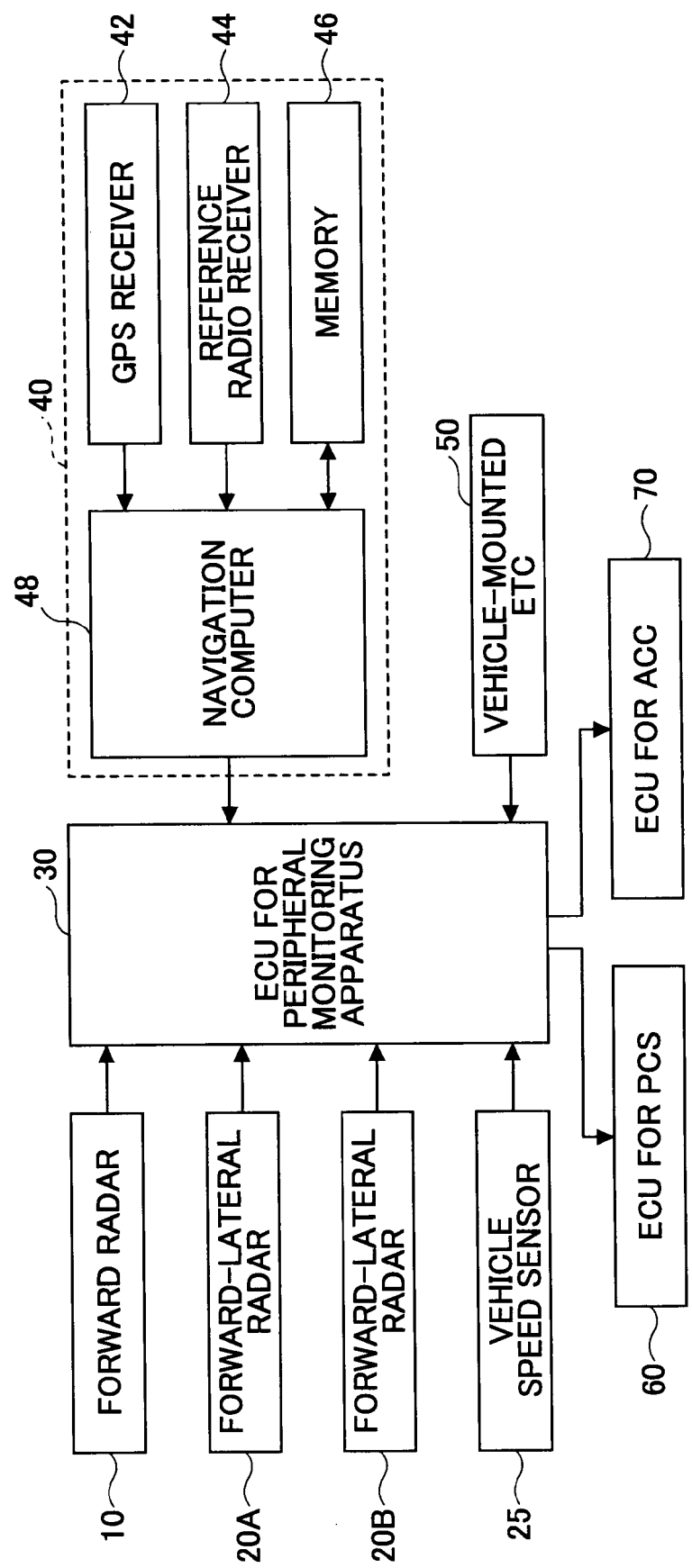
FIG. 8 is a diagram illustrating an example of an overall configuration of a vehicle peripheral monitoring apparatus 3.

A vehicle peripheral monitoring apparatus 3 according to a third embodiment of the present invention is described below. FIG. 8 shows an example of an overall configuration of the vehicle peripheral monitoring apparatus 3. As shown, the vehicle peripheral monitoring apparatus 3 is configured to have not only the elements of the vehicle peripheral monitoring apparatus 1, but also a vehicle speed sensor 25. The same letters are given for the same parts, so that the explanations are omitted.

The vehicle speed sensor 25 includes, for example, wheel speed sensors mounted on the respective wheels, and a skid-control computer for converting a wheel speed pulse signal output by the wheel speed sensor to a rectangular vehicle speed pulse signal (a vehicle speed signal; below referred to as the vehicle speed V) so as to output the converted pulse signal to the EU for the peripheral monitoring apparatus 30.

In comparison to the control process to be executed by the vehicle peripheral monitoring apparatus 1 of the first embodiment, the vehicle peripheral monitoring apparatus 3 of this embodiment is embodied such that operations of the forward-lateral radars 20A and 20B are basically stopped when the vehicle speed V is greater than or equal to a predetermined vehicle speed V1 rather than when the own vehicle is traveling on a predetermined road. The above is based on the assumptions that it is likely that the own vehicle is traveling on a highway or a freeway when traveling at high speed, and that traveling at high speed is relatively difficult where there is a high likelihood of occurrences of another vehicle cutting in and a pedestrian bursting out.

Now this embodiment is embodied such that the forward-lateral radars 20A and 20B are operated when the own vehicle is traveling on a predetermined area, defined in the same manner as in the first embodiment, even when the vehicle speed V is greater than or equal to the predetermined speed V1.

Such a process as described above provides for, during high-speed traveling, operating the forward-lateral radars 20A and 20B only when the operations thereof are needed, and stopping them otherwise. Therefore, the forward-lateral radars 20A and 20B may be appropriately operated according to a probability of occurrence of an obstacle making a lateral entry into a road. In other words, an obstacle around a vehicle may be more appropriately monitored.

Figure 9:
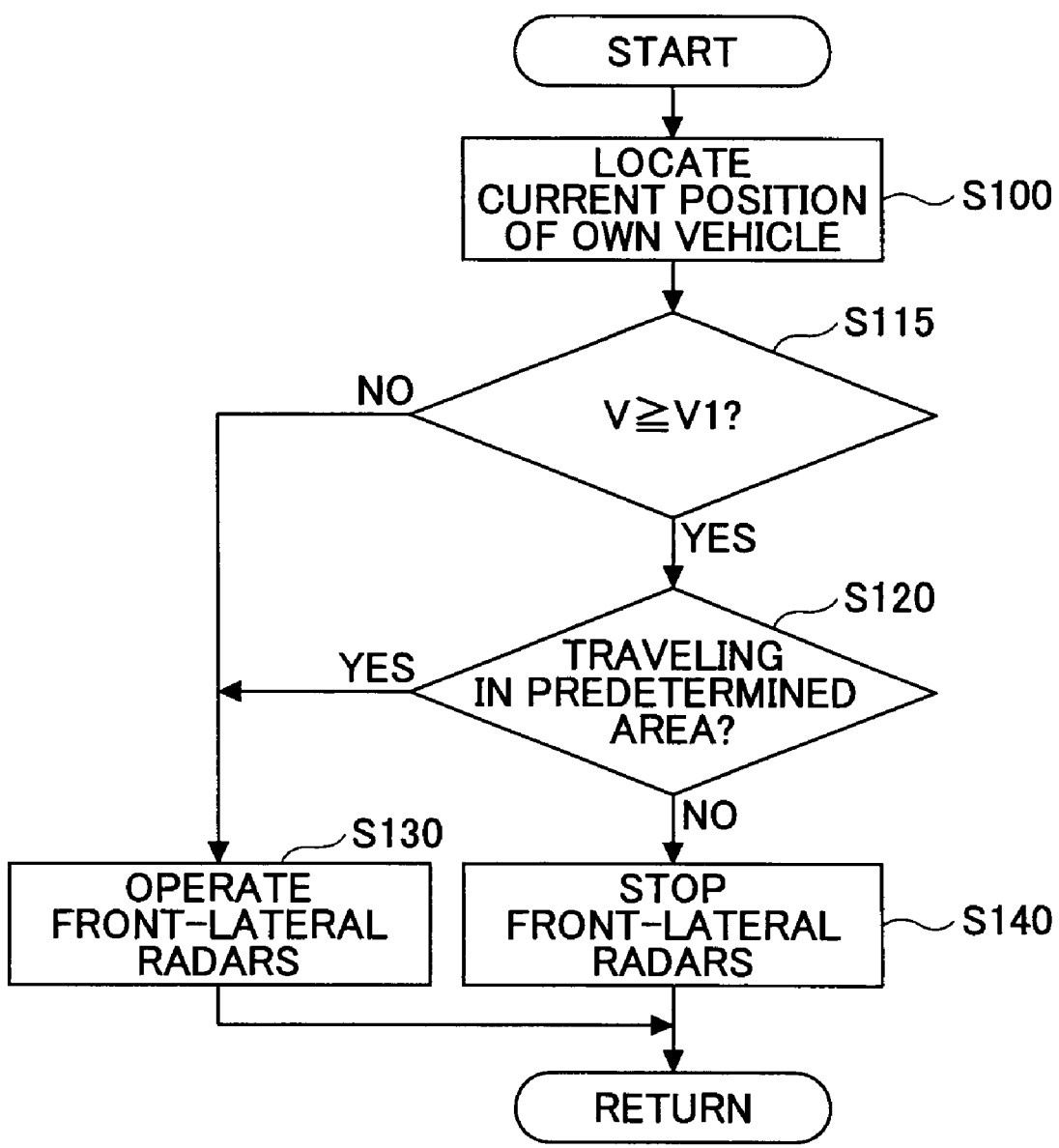
FIG. 9 is a flowchart illustrating a flow of characteristic processes to be executed by the vehicle peripheral monitoring apparatus 3.

FIG. 9 is a flowchart illustrating a flow of characteristic processes to be executed by the vehicle peripheral monitoring apparatus 3. The flow as described above is repeatedly executed every predetermined period, for example. The parts which are the same as in FIG. 4 are given the same step numbers, so that the explanations are omitted.

In this embodiment, the current position of an own vehicle is located (S100), after which whether the vehicle speed V is greater than or equal to the predetermined vehicle speed V1 is determined (S115). If no, the forward-lateral radars 20A and 20B are operated (S130).

On the other hand, if yes, the process proceeds to determining whether the own vehicle is traveling in a predetermined area (S120). If no, the forward-lateral radars 20A and 20B are stopped (S140). Moreover, if yes, the forward-lateral radars 20A and 20B are operated (S130).

The vehicle peripheral monitoring apparatus 3 according to this embodiment provides for stopping the forward-lateral radars 20A and 20B when the own vehicle is traveling at high speed, except when it is traveling in a predetermined area at a junction or around a toll gate, making it possible to more appropriately monitor an obstacle around the own vehicle while reducing electric power consumption, heat dissipation, and unwanted false detecting of an obstacle of the forward-lateral radars 20A and 20B.

Now, it is a matter of course that the vehicle peripheral monitoring apparatus 3 according to this embodiment may also include backward-lateral radars 20C and 20D as in the second embodiment.

The best modes for carrying out the invention have been described in the foregoing using the embodiments as described above. However, the present invention is not limited to such embodiments as described above and may have various alterations and replacements applied without departing from the spirit of the present invention.

For example, while it has been described that the forward-lateral radars 20A and 20B are basically "operated" for the respective cases of traveling in a predetermined road in the first and second embodiments, and of traveling at high speed in the third embodiment, they may be "operated in a suppressed state" instead.

For "operating in a suppressed state" the forward-lateral radars 20A and 20B may be, for example: (1) decreasing the strength of the millimeter-wave output (or decreasing the output); (2) increasing the threshold for detecting an obstacle (or decreasing the sensitivity); or (3) decreasing the output as well as the sensitivity. Further, (1) allows reducing electric power consumption and heat dissipation when traveling on a predetermined road or at high speed (the same for the items below); (2) allows reducing unwanted false detection of an obstacle; and (3) allows reducing electric power consumption, heat dissipation, and unwanted false detection of obstacles.

Moreover, as an example, an alternative of a specific measure for "operating in a suppressed state" the forward-lateral radars 20A and 20B may be embodied as changing the detection period of the forward-lateral radars 20A and 20B to suppress (or facilitate) the operations of the forward-lateral radars 20A and 20B. For example, an embodiment may be to detect an obstacle in X-second intervals when the own vehicle travels on a predetermined road or at high speed (except when traveling at a junction or around a toll gate or when there is another vehicle approaching the own vehicle in the rear), and to detect an obstacle in Y-second intervals, where Y is smaller than X. Such control as described above also makes it possible to more appropriately monitor an obstacle around a vehicle while reducing power consumption, heat dissipation, and unwanted false detecting of obstacles. Moreover, it is a matter of course that the change in the detection period may be combined with the changes in output values and sensitivities as described above.

Furthermore, for all embodiments, relative to a case of the own vehicle traveling on a non-junction side lane, the outputs and/or sensitivities of the forward-lateral radars 20A and 20B may be increased in case the own vehicle is traveling on a junction-side lane when the it has a measure for recognizing the lane the own vehicle is traveling on (such as a camera or a GPS, or a combination thereof imaging a road) and when it is traveling in a predetermined area around a junction. The reason for the above is that there is a higher likelihood for another vehicle to cut in to the front of the own vehicle when the own vehicle is traveling on the junction-side lane than otherwise. Such a process as described above makes it possible for an obstacle around a vehicle to be more appropriately monitored.

Moreover, an embodiment may be embodied to not have the forward radar 10, and forward-lateral radars 20A and 20B as respectively separate units. For example, the areas to be detected by the forward-lateral radars 20A and 20B may be embodied to be extended to the front of the vehicle and may be embodied to shift the areas to the lateral sides when the own vehicle passes a predetermined alert area. The embodiment may have a swinging radar unit as a mechanism to make the areas to be detected variable in the case as described above.

Moreover, while the embodiments have been described such that they include, as a controller, an ECU for the peripheral monitoring apparatus 30 dedicated to the apparatus of the present invention, it may be embodied such that another ECU such as the navigation computer 48, the ECU for PCS 60, and the ECU for ACC 70 becomes the controller for the apparatus of the present invention (the ECU for the peripheral monitoring apparatus 30 become integrated into other ECU's).

Moreover, an embodiment may be such as to not include the front radar 10 and to perform only monitoring in the front-lateral direction with the front-lateral radars 20A and 20B.

Furthermore, this embodiment may be such as to not include the vehicle-mounted ETC 50 and to determine, with only the navigation apparatus 40, whether the own vehicle is traveling on a predetermined road or in a predetermined area.

The present invention may be applicable in automotive and automotive component manufacturing.

The present application is based on Japanese Priority Patent Application No. 2006-337500 filed Dec. 14, 2006 with the Japanese Patent Office, the entire contents of which is hereby incorporated by reference.

What is claimed is:

1. A vehicle peripheral monitoring apparatus, comprising:
a forward monitoring unit that monitors an obstacle within a predetermined forward area extending in a direction forward of an own vehicle;
one or a plurality of forward-lateral monitoring units that monitor an obstacle within a predetermined forward-lateral area extending in a direction lateral of the own vehicle relative to the predetermined forward area; and
a traveling environment detecting unit that detects whether the own vehicle is traveling on a predetermined road including a highway, whether the own vehicle is traveling in a predetermined area, including a junction, of the predetermined road, and a lane on which the own vehicle is traveling on, wherein
the monitoring with the forward-lateral monitoring units is suppressed when the traveling environment detecting unit detects that the own vehicle is traveling on the predetermined road including a highway,
a level of the suppressing of the monitoring with the forward-lateral monitoring units is eased when the traveling environment detecting unit detects that the own vehicle is traveling in a predetermined area, including the junction, of the predetermined road, and
when the traveling environment detecting unit detects that the own vehicle is traveling on a junction-side lane, an output and/or sensitivity of the forward monitoring unit is increased relative to a case when the traveling environment detecting unit detects that the own vehicle is not traveling on the junction-side lane.

2. The vehicle peripheral monitoring apparatus as claimed in claim 1, wherein the predetermined road further includes a freeway.

3. The vehicle peripheral monitoring apparatus as claimed in claim 1, wherein the predetermined area further includes an area around a toll gate of the predetermined road.

4. The vehicle peripheral monitoring apparatus as claimed in claim 1, wherein
when the traveling environment detecting unit detects that the own vehicle is traveling in the predetermined area, the level of the suppressing of the monitoring with the forward-lateral monitoring units is greatly eased in a case where the traveling environment detecting unit detects that the own vehicle is traveling on the junction-side lane relative to a case where the traveling environment detecting unit detects that the own vehicle is not traveling on the junction-side lane.

5. The vehicle peripheral monitoring apparatus as claimed in claim 1, wherein
the monitoring with the forward monitoring unit is maintained even when the traveling environment detecting unit detects that the own vehicle is traveling on the predetermined road.

6. The vehicle peripheral monitoring apparatus as claimed in any one of claims 1 to 5, comprising:
one or more backward-lateral monitoring units that monitor an obstacle within a predetermined backward-lateral area extending in a direction backward of the own vehicle relative to the predetermined forward-lateral area, wherein
when the traveling environment detecting unit detects that the own vehicle is traveling on the predetermined road, and
the level of the suppressing of the monitoring with the forward-lateral monitoring units is eased in a case where the backward-lateral monitoring units detect an obstacle approaching in the rear of the own vehicle at a speed greater than or equal to a predetermined relative speed.

7. A vehicle peripheral monitoring apparatus, comprising:
a forward monitoring unit that monitors an obstacle within a predetermined forward area extending in a direction forward of an own vehicle;
one or a plurality of forward-lateral monitoring units that monitor an obstacle within a predetermined forward-lateral area extending in a direction lateral of the own vehicle relative to the predetermined forward area;
a vehicle speed obtaining unit that obtains a vehicle speed; and
a traveling environment detecting unit that detects a traveling environment of the own vehicle, the traveling environment detecting unit including a navigation computer and a GPS receiver; wherein
the monitoring with the forward-lateral monitoring units is suppressed when the vehicle speed obtaining unit obtains a vehicle speed greater than or equal to a predetermined vehicle speed, and
a level of the suppressing of the monitoring with the forward-lateral monitoring units is eased when the traveling environment detecting unit determines a position of the own vehicle with the navigation computer via GPS data received by the GPS receiver and detects that the own vehicle is traveling in a predetermined area, including a junction, of a predetermined road including a highway.

8. A vehicle peripheral monitoring apparatus, comprising:
a forward monitoring unit that monitors an obstacle within a predetermined forward area extending in a direction forward of an own vehicle;
one or a plurality of forward-lateral monitoring units that monitor an obstacle within a predetermined forward-lateral area extending in a direction lateral of the own vehicle relative to the predetermined forward area; and
a traveling environment detecting unit that detects a traveling environment of the own vehicle, the traveling environment detecting unit including a navigation computer and a GPS receiver; wherein
the monitoring with the forward-lateral monitoring units is suppressed when the traveling environment detecting unit determines a position of the own vehicle with the navigation computer via GPS data received by the GPS receiver and detects that the own vehicle is traveling on a predetermined road including a highway.

9. A vehicle peripheral monitoring apparatus, comprising:
one or a plurality of forward-lateral monitoring units that monitor an obstacle present in a forward-lateral direction of an own vehicle; and
a traveling environment detecting unit that detects a traveling environment of the own vehicle, the traveling environment detecting unit including a navigation computer and a GPS receiver, wherein
the monitoring with the forward-lateral monitoring units is suppressed when the traveling environment detecting unit determines a position of the own vehicle with the navigation computer via GPS data received by the GPS receiver and detects that the own vehicle is traveling on a predetermined road including a highway, and
a level of the suppressing of the monitoring with the forward-lateral monitoring units is eased when the traveling environment detecting unit determines the position of the own vehicle with the navigation computer via the GPS data and detects that the own vehicle is traveling in a predetermined area, including a junction, and/or an area around a toll gate, of the predetermined road.

10. A vehicle peripheral monitoring apparatus as claimed in claim 7, wherein
the traveling environment detecting unit further includes a memory that stores map information, and
the navigation computer determines the own vehicle position using the GPS data and compares the vehicle position to the map information to determine whether the vehicle is traveling in the predetermined area of the predetermined road.

11. A vehicle peripheral monitoring apparatus as claimed in claim 8, wherein
the traveling environment detecting unit further includes a memory that stores map information, and
the navigation computer determines the own vehicle position using the GPS data and compares the vehicle position to the map information to determine whether the vehicle is traveling on the predetermined road.

12. A vehicle peripheral monitoring apparatus as claimed in claim 9, wherein
the traveling environment detecting unit further includes a memory that stores map information, and
the navigation computer determines the own vehicle position using the GPS data and compares the vehicle position to the map information to determine whether the vehicle is traveling in the predetermined area of the predetermined road.

* * * * *